UNITED STATES PATENT OFFICE.

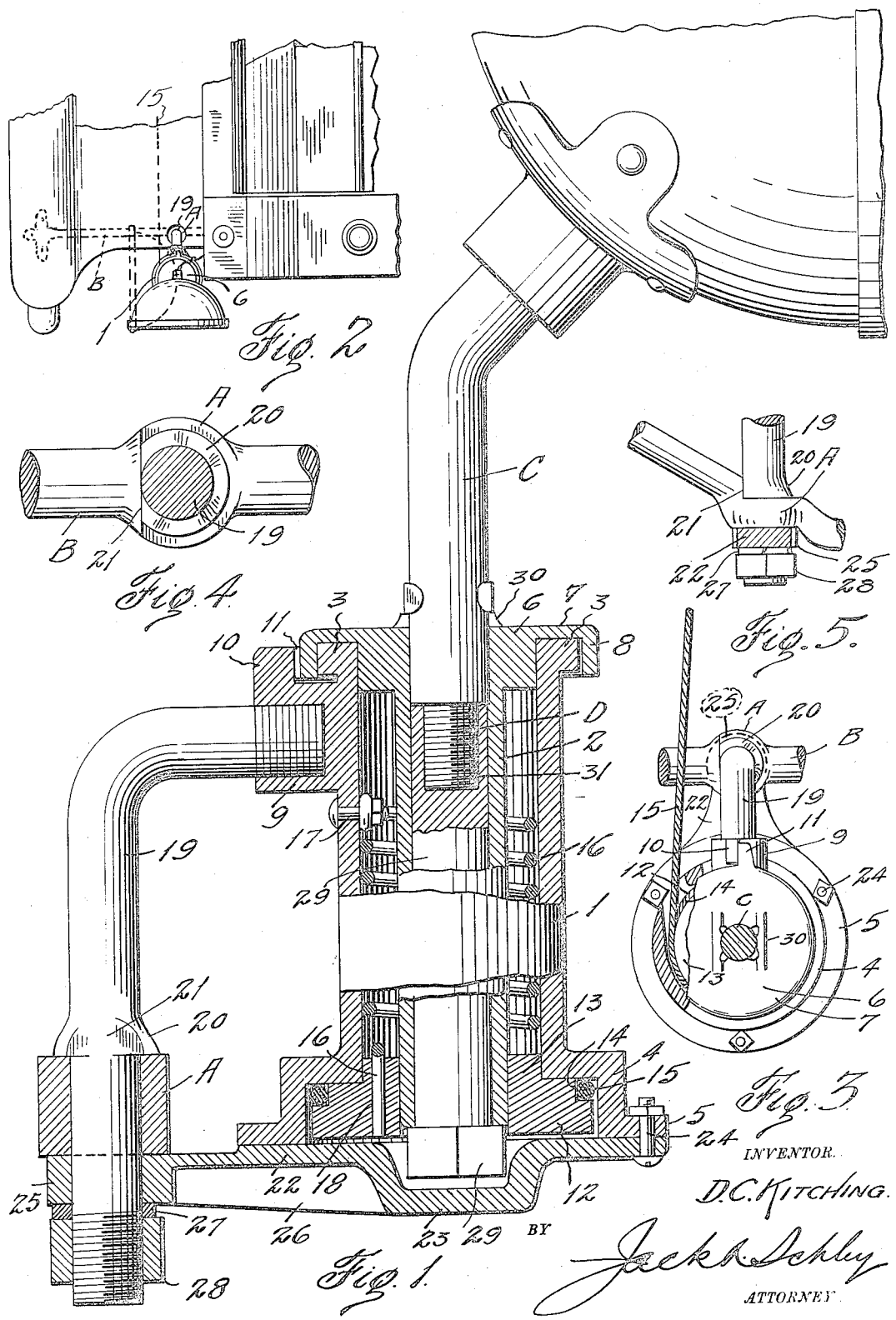

DAVID C. KITCHING, OF VALLEY MILLS, TEXAS.

AUTOMOBILE-HEADLIGHT-LAMP MOUNTING.

1,224,470. Specification of Letters Patent. Patented May 1, 1917.

Application filed November 22, 1916. Serial No. 132,739.

*To all whom it may concern:*

Be it known that I, DAVID C. KITCHING, a citizen of the United States, residing at Valley Mills, in the county of Bosque and State of Texas, have invented certain new and useful Improvements in Automobile-Headlight-Lamp Mountings, of which the following is a specification.

This invention embodies certain improvements on the lamp bracket covered by Letters Patent Number 1,129,207, issued to me the 23rd day of February, 1915.

In carrying out the invention a relatively fixed supporting member carries a rotatable member having means of a novel nature for fastening a lamp thereto. The rotatable member when operated swings the lamp in the arc of a circle.

One of the features is embodied in a bracket arranged to be secured to the fender brace of an automobile whereby the supporting member is rigidly held in position at a minimum elevation.

A further feature is carried out in a bottom supporting and closure plate which is secured to the bracket and the relatively fixed member and whereby the lower end of the said fixed member is closed and the interior mechanism protected from dust, mud and water.

The primary idea involved in this invention is to provide a lamp mounting for swinging a lamp, said mounting including means whereby the lamp may be removed from its normal fastening and fastened in the mounting and the mounting substituted in the normal fastening of the lamp.

The invention will be more readily understood from a perusal of the following specification and by reference to the accompanying drawing, in which an example of the invention is shown and wherein:

Figure 1 is a side view of the mounting and the lamp, the greater portion of the mounting being shown in section, Fig. 2 is a plan view of one side of the front of an automobile equipped with the invention, Fig. 3 is a plan view of the mounting, a portion being shown in section to illustrate underlying parts, Fig. 4 is a sectional detail of the bracket and fender brace connection, and Fig. 5 is a front elevation of the same parts.

In the drawings the numeral 1 designates a cylindrical outer shell or member which I have termed the "relatively fixed" member and within this member a rotatable member 2 is disposed. The outer member 1 has an outwardly directed bearing flange 3 surrounding its upper end; while its lower end terminates in a shoulder enlargement 4 having an outwardly directed flange 5 surrounding its lower extremity. The shank of the inner member 2 is somewhat smaller than the inner diameter of the outer member whereby a space is provided between the two. The inner member has a head 6 at its upper end filling the upper end of the member 1. This head is integral with a radial flange 7 resting on the bearing flange 3 of the member 1 and carrying a depending apron 8 surrounding the flange 3. The load of the inner member is carried by the flange 3 through the agency of the flange 7; while the lateral thrust is borne by the head and the side wall of the outer member.

The member 1 has a boss 9 projecting from under the flange 3 and this boss is provided with an upstanding stop lug 10, which is in the path of a stop finger 11 projecting from the apron 8; whereby the inner member is arrested in its normal position. The lower end of the member 2 terminates short of the plane of the bottom of the outer member and has fastened thereon a sheave member 12, the fastening being effected in any suitable manner. This member has on its upper surface a boss 13 of smaller diameter, but having a bearing fit within the bore of the outer member, the sheave portion extending radially into the enlargement 4. This sheave member has a peripheral cord or cable seat 14 in which a cable 15 has one end fastened. A spring 16 is coiled about the shank of the inner member within the bore of the outer member and has its upper end fastened to the wall of the outer member by a bolt 17; while its lower end is inserted in an aperture 18 in the sheave member. The member 12 of course being fixed to the inner member, rotates the same when the cable is unwound from said member 12. The outer member being immovable and one end of the spring being attached thereto, said spring will be coiled under considerable tension by the rotation of the inner member and consequently when the cable is released the spring will uncoil and rotate the inner member in a reverse direction until the finger 11 engages the stop 10.

This construction is particularly adapted to be attached to the fender brace of an automobile in the socket from which the lamp has been previously removed. It is to be understood that while this is one of the prime features it is not necessarily essential as the mounting could be fastened to other parts of the automobile.

In carrying out the construction just referred to, the boss 9 is bored out and threaded to receive the horizontal threaded end of an angular supporting bracket 19. The depending portion of the bracket has intermediate its ends an enlarged portion or integral collar 20 having a flat side 21. In attaching to an automobile the bracket is passed down through the socket A of the fender rod B from which the shank C and threaded reduced end D thereof, have been removed. The rod or brace B has a flat shoulder E at the socket and the flat side 21 of the collar engages this shoulder while the collar 20 rests on the socket. The collar 20 and its flat side 21 are essential to this form of bracket, but could be eliminated if another manner of fastening the mounting on the car was adopted.

The bracket projects below the socket and has its extremity threaded. For closing the bottom of the member and also supporting it in a rigid position I provide a bottom closure plate 22 which is ample enough to cover the enlargement 4 and terminate flush with the flange 5, at the same time extending and supporting an integral collar 25 through which the bracket is passed. The collar 25 fits up against the underside of the socket A and lock-washer 27 and a nut 28 mounted on the bracket, fasten the plate in position at this point. The plate is fastened to the flange 5 by bolts 24. A depression 23 is formed in the plate under the member 2 and a strengthening rib 26 extends on the under side of the plate from the depression to the collar 25.

The member 2 is tubular and a clamp-bolt or fastening member 29 is passed up through the same from the bottom, the head of bolt bearing against the lower end of the said member and the depression 23 accommodating said head. The bore of the member 2 extends through the head 6 and the opening thereof is flanked by upstanding ribs 30 on the upper surface of said head. The bolt terminates below the head and has an internally threaded socket 31 in its upper end. The shank of a lamp may be inserted in the opening in the head 6 and the threaded end engaged in the socket 31, provision being made on the shank to coöperate with the ribs for holding the shank against rotation independent of the inner member 2. This construction may be varied according to conditions. Where the bracket is inserted in the lamp socket of the fender brace rod, the shank C of the lamp is upset adjacent the ribs 30 so that portions will engage said ribs and hold the shank against independent rotation; while the reduced threaded end D is engaged in the socket 31 of the bolt. The upset portions of the shank also rest on the ribs so that when the bolt is screwed up the shank is clamped in position.

It will be seen that the attaching of this mounting to certain makes of automobiles is a very simple matter. The nut holding the shank C in the socket A is removed and the shank lifted out and fastened in the member 2; the bracket 19 is then inserted in the socket A, the closure plate 22 is fastened in position and the lock-washer 27 and nut 28 are placed on the bracket, thus completing the installation. From the foregoing description it will be apparent that a rearward pull on the cable 15 unwinds the same from the sheave member 12 whereby the inner member 2 is rotated and the shank C of the lamp swung. The lamp is thus swung to the side as indicated in dotted lines in Fig. 2, and is returned to its normal position when released. The bracket 19 being attached to the socket A intermediate the ends of the former does not elevate the lamp as much as where the connection is made below the bottom of the outer member. Further no cross braces between the mounting on one side and that on the other side are necessary.

What I claim is:

1. The combination with the shank of an automobile headlight lamp, of a relatively fixed support, a lamp swinging member rotatively mounted in and surrounded by the support, and means extending through the swinging member for engaging and fastening the shank to said member.

2. The combination with the shank of an automobile headlight lamp, of a relatively fixed support, a lamp swinging member rotatively mounted in and surrounded by the support, means extending through the swinging member for engaging and fastening the shank to said member, and a closure plate covering the bottom of the support and concealing the fastening means.

3. In a headlight-lamp adjusting device, an outer relatively fixed member, an inner rotatable member within the outer member constructed for supporting a lamp, a spring coiled about the inner member and having one end connected with the inner member and the other end connected with the fixed member, an angular bracket extending from the fixed member radially and constructed for attachment to an automobile, and a closure member covering the bottom of the fixed member and attached to the bracket.

4. In a headlight-lamp adjusting device, a hollow relatively fixed outer member, an inner member rotatably mounted in the fixed member and constructed for supporting a lamp, a spring having one end attached to one member and the other end attached to the other member, a rotating member fastened on the inner member within the outer member, a closure member secured to the bottom of the fixed outer member and concealing the rotating member, and a supporting bracket extending radially from the outer member and by which the outer fixed member may be supported on an automobile.

5. The combination with the shank of an electric headlight lamp, of a relatively fixed supporting member constructed for attachment to an automobile, a rotatable member mounted in the support and constructed to receive the shank of the lamp, a fastening device carried by the rotatable member for engaging the lamp shank and fastening the same to the rotatable member, and a rotating element fastened to the rotatable member.

In testimony whereof I affix my signature.

DAVID C. KITCHING.